(12) United States Patent
Lien

(10) Patent No.: US 7,261,125 B1
(45) Date of Patent: Aug. 28, 2007

(54) VALVE ASSEMBLY FOR LIQUID CONTAINERS

(75) Inventor: Chien Ping Lien, Taipei Hsien (TW)

(73) Assignee: Taiwan Vertex Production Corp., Taipei Hsien (TW)

( * ) Notice: Subject to any disclaimer, the term of this patent is extended or adjusted under 35 U.S.C. 154(b) by 42 days.

(21) Appl. No.: 11/376,245

(22) Filed: Mar. 16, 2006

(51) Int. Cl.
*F16L 37/28* (2006.01)
(52) U.S. Cl. .................... 137/614.04; 285/320
(58) Field of Classification Search ........... 137/614.03, 137/614.04, 614.05; 285/320
See application file for complete search history.

(56) References Cited

U.S. PATENT DOCUMENTS 4,946,455 A * 8/1990 Rosen ................... 137/614.04
5,628,726 A * 5/1997 Cotter ................... 137/614.04
5,845,943 A * 12/1998 Ramacier et al. ...... 137/614.04
6,050,297 A * 4/2000 Ostrowski et al. ..... 137/614.04
6,443,496 B2 * 9/2002 Campau ..................... 285/320

* cited by examiner

*Primary Examiner*—Kevin Lee
(74) *Attorney, Agent, or Firm*—Bacon & Thomas, PLLC

(57) ABSTRACT

A valve assembly for liquid containers includes a base fixed on the water bottle and a connector unit which is connected to the base by a locking member. Each of the base and the connector unit includes a valve piece which is biased by a spring to seal the base and the connector unit respectively. When the connector unit is connected to the base, the two valve pieces push against to each other to compress the two respective springs so as to release the sealing status of both of the base and the connector unit. The connector unit includes a connection portion and a hose can be connected to the connection portion. The user can have the water in the bottle via the hose while the connection portion can be rotated 360 degrees.

4 Claims, 6 Drawing Sheets

VALVE ASSEMBLY FOR LIQUID CONTAINERS

FIELD OF THE INVENTION

The present invention relates to a valve assembly for liquid containers wherein the connector unit can be easily removed from the base while the base is still sealed.

BACKGROUND OF THE INVENTION

A conventional liquid container such as a water bottle or water bag for outdoor use generally includes a container with a base connected to the container and a hose is connected to the base so as to suck the water in the container. Once the hose is disengaged from the base, the container is not sealed so that water may flow out from the opening of the base. In other words, the users have to carry the water bottle together with the hose connected with the base, this is in convenient because the hose might be tangled by other objects. Besides, the hose is fixedly connected to the base so that during having the water via the hose, the hose cannot be twisted or the volume of water is reduced. A valve assembly that can still be sealed when the hose is separated from the base is needed.

The present invention intends to provide a valve assembly for a water bottle and includes a base and a connector unit wherein each of the base and the connector unit has a valve piece biased by a spring so as to seal the base and the connector unit respectively when the connector unit is separated from the base.

SUMMARY OF THE INVENTION

The present invention relates to a valve assembly for liquid containers and the valve assembly comprises a base and a connector unit which is connected to the base by a locking member. Each of the base and the connector unit has a seat extending radially inward from an inner periphery thereof and each of the base and the connector unit has a valve piece movably received therein. Each of the valve pieces includes a valve body including a hollow tubular body and a head. Each tubular body has a flange at a distal end thereof and a plurality of slots are defined through a wall of the tubular body. A groove is defined in an outer periphery of each of the heads and a seal is engaged with each of the grooves. A spring is mounted on the valve body in the base and biased between the flange and the seat of the base. The seat of the body is located between the spring and the head of the base.

The connector unit has inward ribs located therein and the second spring is biased between the head and the inward rib. The spring and the head both are located on one of two sides of the seat in the connector unit. The locking member includes a C-shaped collar and two locking pieces are connected to the C-shaped collar. The C-shaped collar rotatably is mounted on the connector unit and the two locking pieces extend through the connection rings and hooked on the bodies of the connection rings.

The primary object of the present invention is to provide a valve assembly for liquid container wherein the connector unit can be easily connected to or disengaged from the base, and the base seals the container when the connector unit is removed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
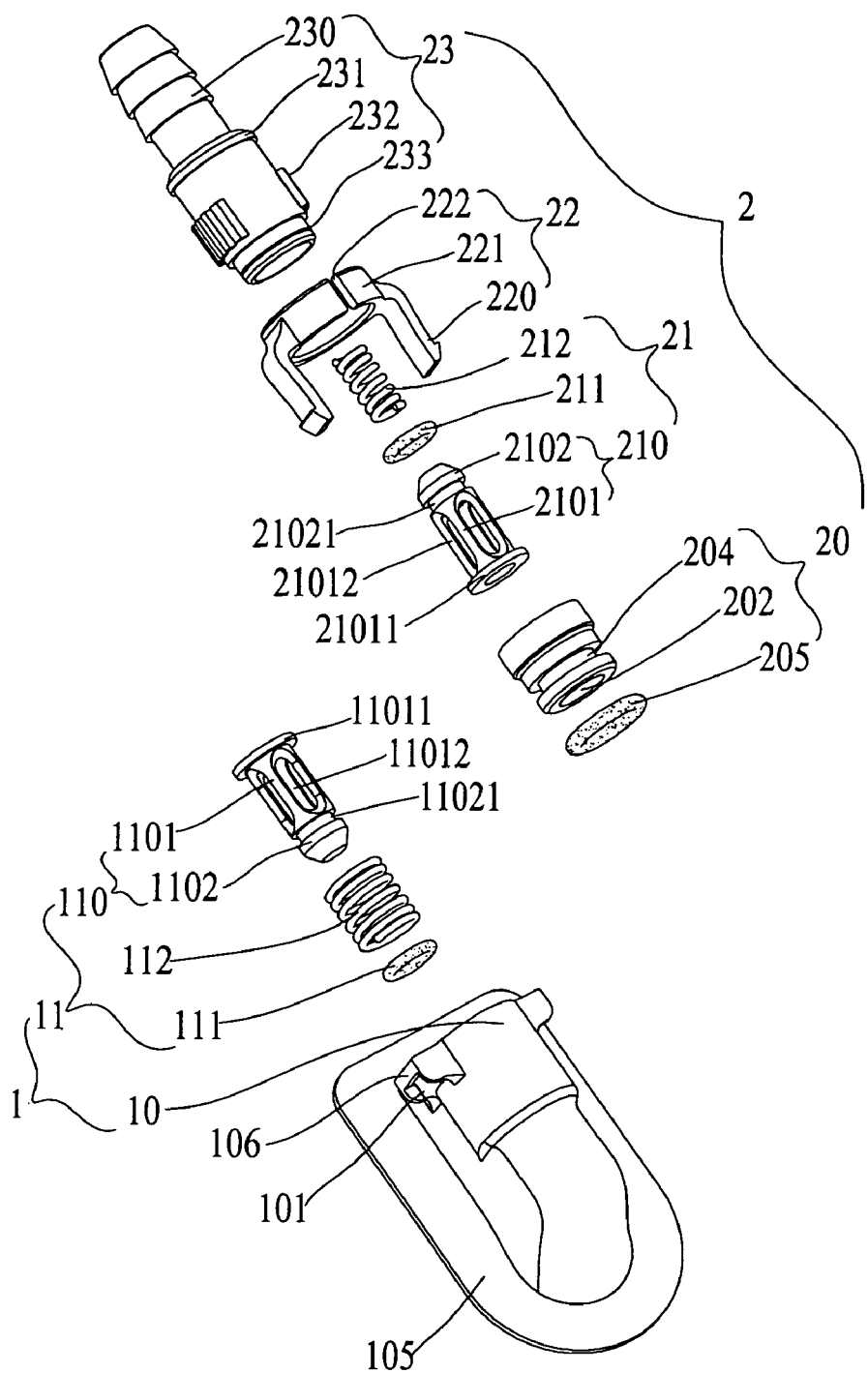
FIG. 1 is an exploded view to show the valve assembly of the present invention.
Figure 2:
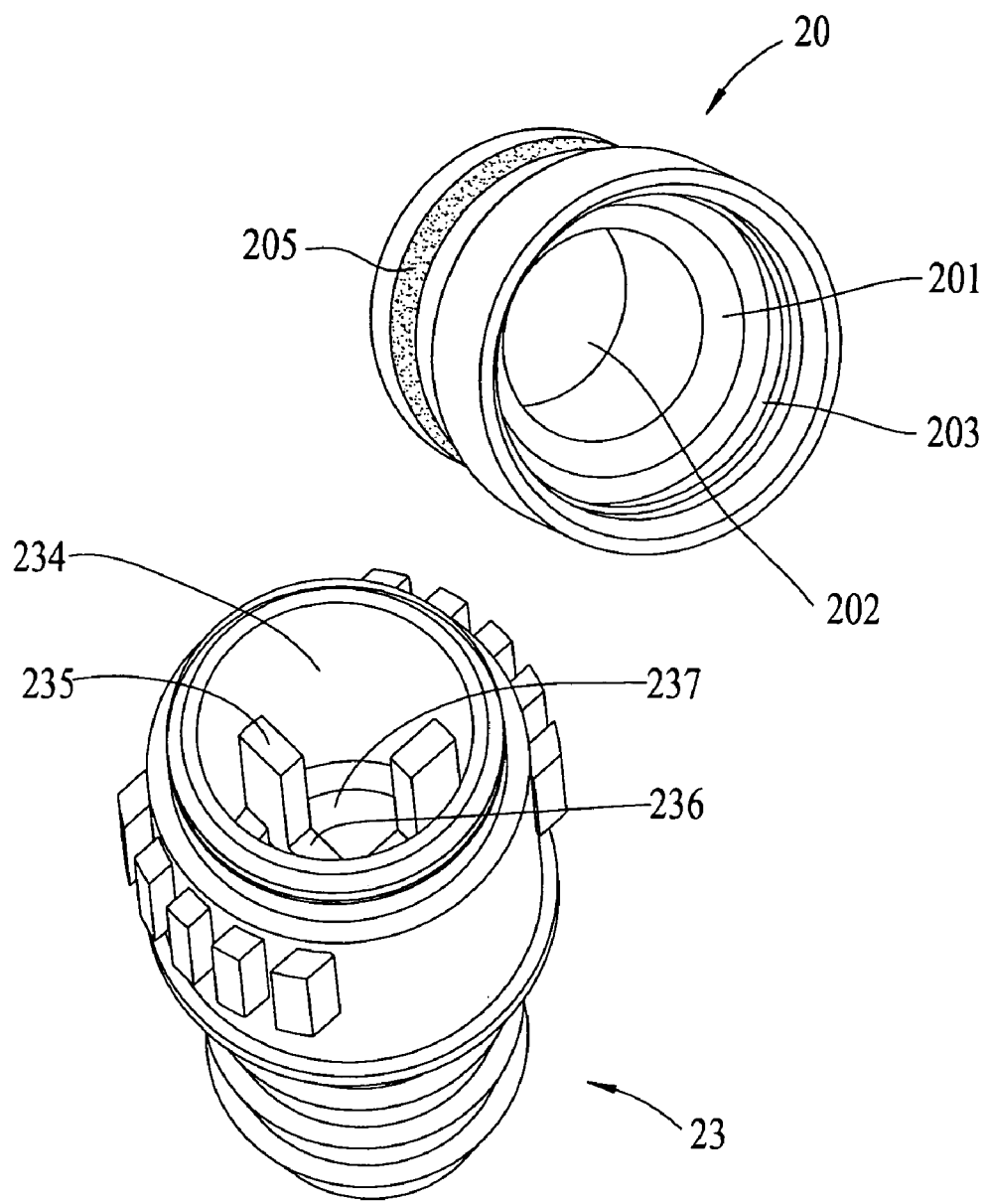
FIG. 2 shows the connection portion and the end collar of the valve assembly of the present invention.
Figure 3:
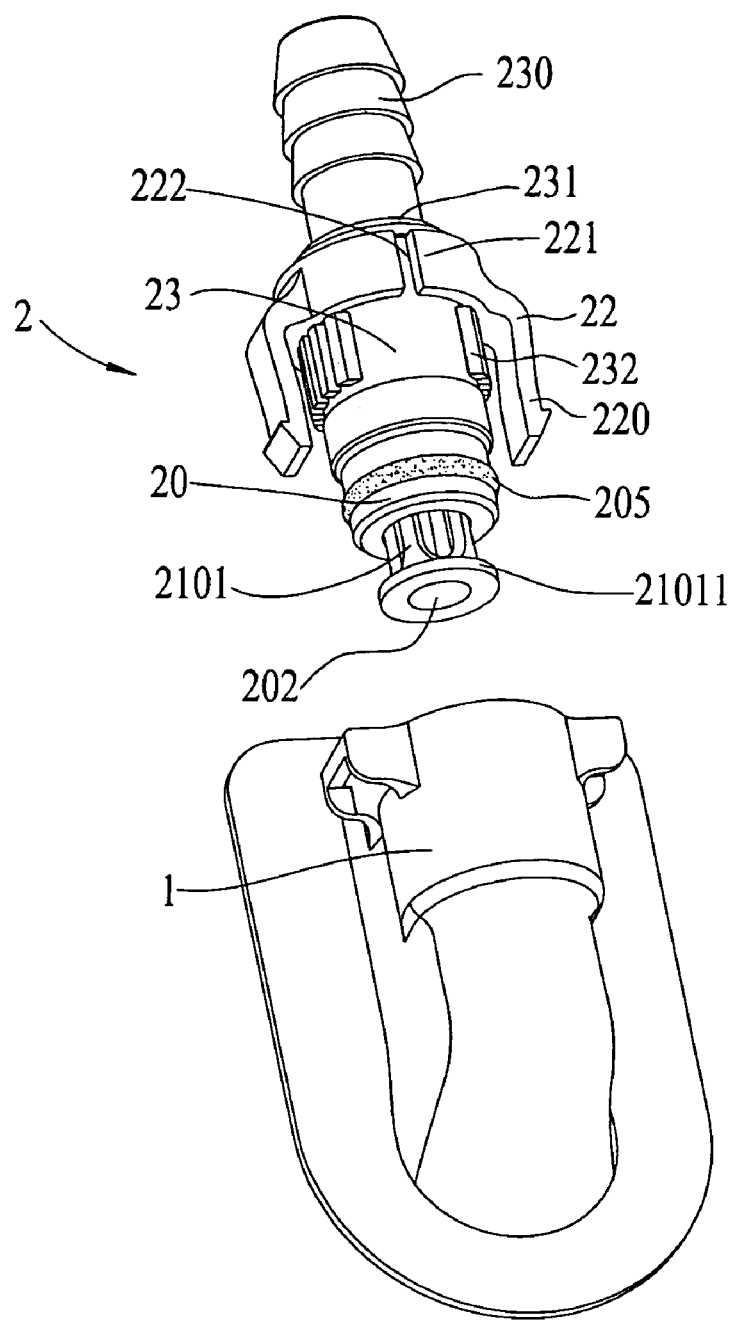
FIG. 3 is a perspective view to show the base and the connector unit of the valve assembly of the present invention.
Figure 4:
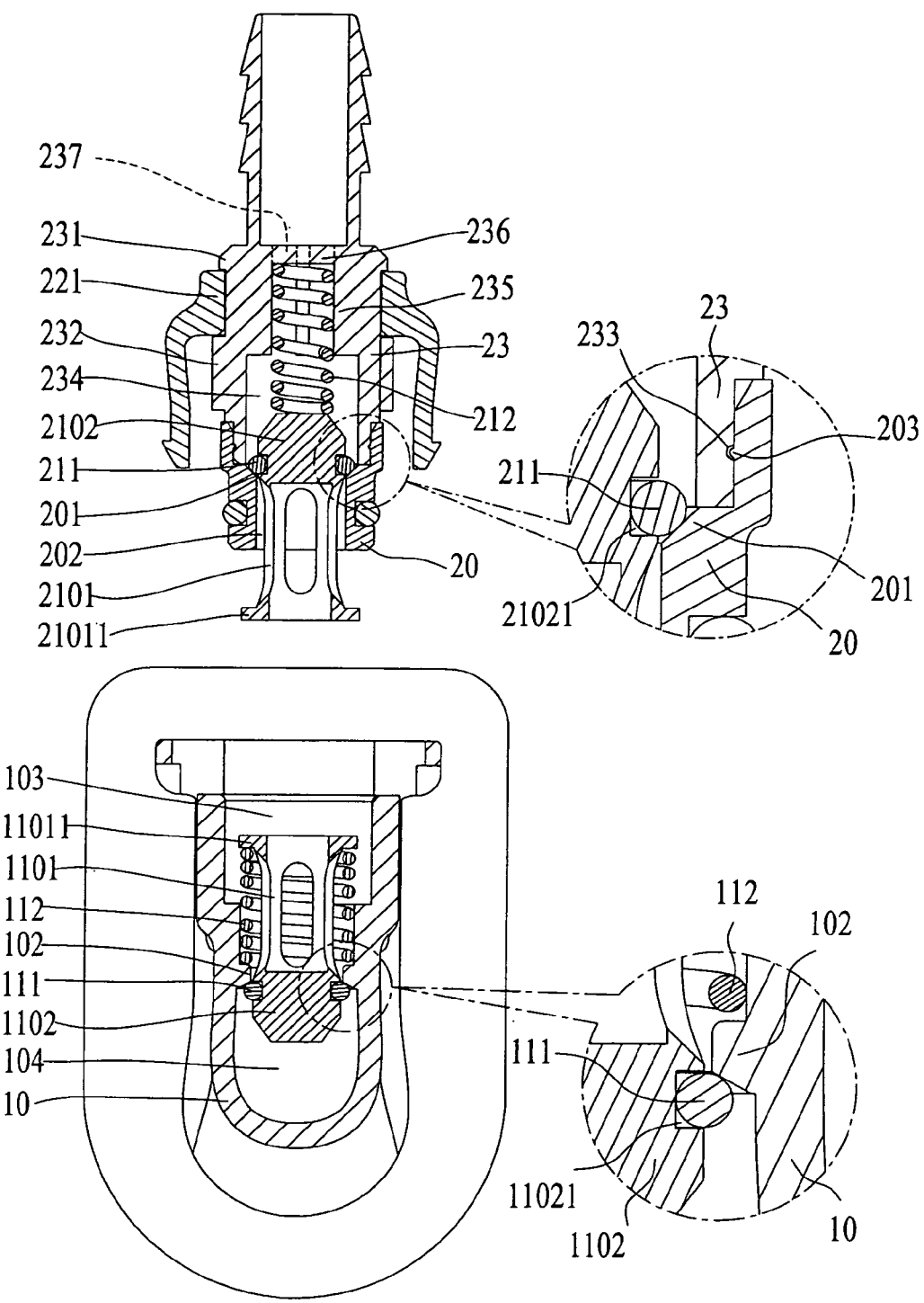
FIG. 4 is a cross sectional view of the base and the connector unit of the valve assembly of the present invention.

Referring to FIGS. 1 to 4, the valve assembly for liquid containers comprises a base 1 and a connector unit 2 which is connected to the base 1 by a locking member 22. The base 1 has a hollow casing 10 and a connection flange 105 extends therefrom so as to be connected to a water bottle or a water bag (not shown). A first seat 102 extends radially inward from an inner periphery of the hollow casing 10 so as to define a first chamber 103 and a second chamber 104 in the hollow casing 10. Two connection rings 101 are connected to an outside of the hollow casing 10.

A first valve piece 11 is movably received in the hollow casing 10 and includes a first valve body 110 which includes a hollow first tubular body 1101 at one end thereof and a first head 1102 on the other end of the hollow first valve body 110. The first tubular body 1101 has a first flange 11011 at a distal end thereof and a plurality of first slots 11012 are defined through a wall of the first tubular body 1101. A first groove 11021 is defined in an outer periphery of the first head 1102 and a first seal 111 is engaged with the first groove 11021. A first spring 112 is mounted on the first valve body 110 and biased between the first flange 11011 and the first seat 102. The first seat 102 is located between the first spring 112 in the first chamber 103 and the first head 1102 in the second chamber 104.

The connector unit 2 includes an end collar 20, a second valve piece 21, the locking member 22 and a connection portion 23. A second seat 201 is defined in the connection portion 23 and a second valve piece 21 is movably received in the connection portion 23. The second valve piece 21 includes a second valve body 210 which includes a hollow second tubular body 2101 at one end thereof and a second head 2102 on the other end of the hollow second valve body 210. The second tubular body 2101 has a second flange 21011 at a distal end thereof and a plurality of second slots 21012 are defined through a wall of the second tubular body 2101. A second groove 21021 is defined in an outer periphery of the second head 2102 and a second seal 211 is engaged with the second groove 21021. The connection portion 23 has a stepped inner periphery and a third chamber 234 is defined in the connection portion 23. The second valve body 210 is located in the third chamber 234. A plurality of projections 235 extend from the stepped inner periphery of the connection portion 23 and have inward ribs 236. An outlet 237 is defined between the projections 235 and the inward ribs 236. A second spring 212 is located in a space between the projections 235 and biased between the second head 2102 and the inward rib 236. The second spring 212 and the second head 2102 are both located on one of two sides of the second seat 201.

The end collar 20 is connected to a first end of the connection portion 23 and the second valve piece 21 is located in the connection portion 23. The second tubular body 2101 extends through a passage 202 defined through the end collar 20 and extends out from the end collar 20 and faces the first tubular body 1101. The second seat 201 is located in an inner periphery of the end collar 20 and an engaging flange 203 is formed on the inner periphery of the end collar 20. A third groove 204 is defined in an outer periphery of the end collar 20 and a third seal 205 is engaged with the third groove 204, The connection portion 23 has a plurality of cone-shaped protrusions 230 on an outer periphery of a second end thereof so as to be connected with a hose (not shown). A stop 231 extends radially outward from a mediate portion of the connection portion 23 and a plurality of limitation members 232 extend from an outer periphery of the first end of the connection portion 23. An engaging groove 233 is defined in the outer periphery of the first end of the connection portion 23.

The locking member 22 includes a C-shaped collar 221 and two locking pieces 220 are connected to the C-shaped collar 221. The C-shaped collar 221 is rotatably mounted on the connector unit 2 and the two locking pieces 220 extend through the connection rings 101 and hooked on the bodies 106 of the connection rings 101. The C-shaped collar 221 of the locking member 22 is located between the stop 231 and the limitation members 232 and the engaging flange 203 is engaged with the engaging groove 233. The C-shaped collar 221 has a slit 222 defined therethrough so that the C-shaped collar 221 is expandable such that the locking member 22 can be easily disengaged from the connection portion 23.

Figure 5:
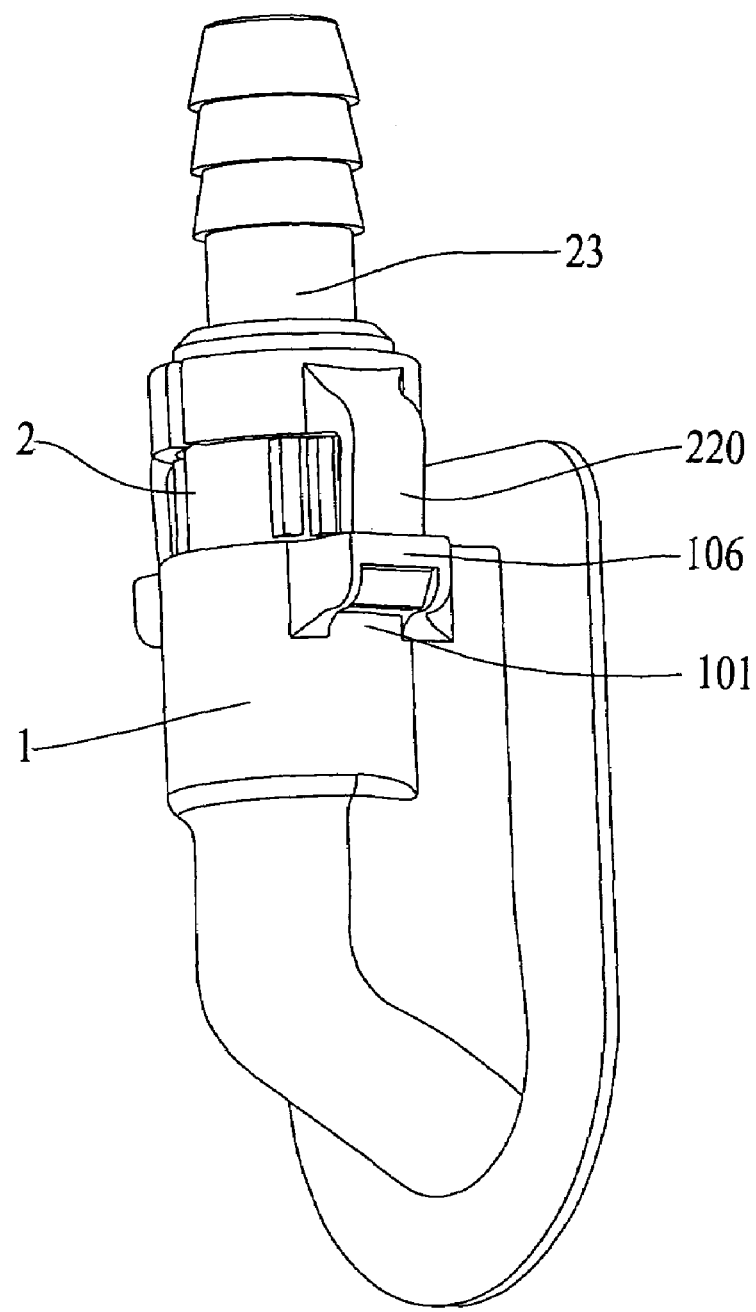
FIG. 5 is a perspective view to show that the connector unit is connected to the base of the present invention.
Figure 6:
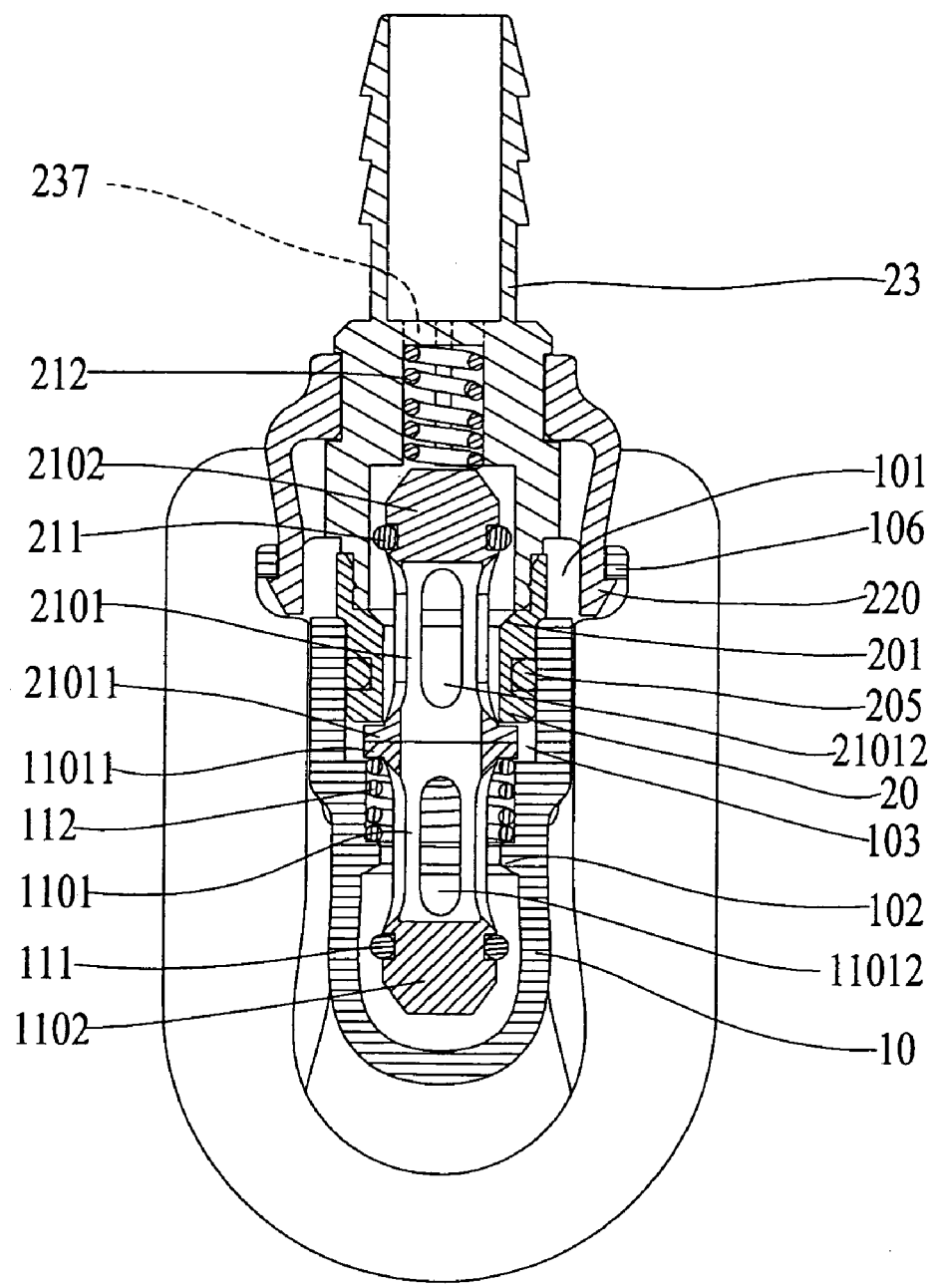
FIG. 6 shows a cross sectional view of the valve assembly wherein the connector unit is connected to the base.

As shown in FIGS. 5 and 6, when the connector unit 2 is connected to the base 1, the first and second tubular bodies 1101, 2101 push each other so as to compress the first and second springs 112, 212. Therefore, the movement of the first and second tubular bodies 1101, 2101 remove the first and second seals 111, 211 from the first and second seats 102, 201 such that the base 1 and the connector unit 2 are in communication with each other. The end collar 20 is inserted into the first chamber 103 and the third seal 205 seals the hollow casing 10. The users may have the water from the hose while the connection portion 23 can be rotatable without twisting the hose. The connector unit 2 is easily disengaged from the base 1 by squeezing the two locking pieces 220 inward to remove the two locking pieces 220 from the connection rings 101.

While we have shown and described the embodiment in accordance with the present invention, it should be clear to those skilled in the art that further embodiments may be made without departing from the scope of the present invention.

What is claimed is:

1. A valve assembly for liquid containers, comprising:

a base having a hollow casing and a first valve piece movably received in the hollow casing, a first seat extending radially inward from an inner periphery of the hollow casing so as to define a first chamber and a second chamber in the hollow casing, the first valve piece including a first valve body which includes a hollow first tubular body at one end thereof and a first head on the other end of the hollow first valve body, the first tubular body having a first flange at a distal end thereof and a plurality of first slots defined through a wall of the first tubular body, a first groove defined in an outer periphery of the first head and a first seal engaged with the first groove, a first spring mounted on the first valve body and biased between the first flange and the first seat, the first seat located between the first spring in the first chamber and the first head in the second chamber, two connection rings connected to an outside of the hollow casing;

a connector unit having a second seat therein and a second valve piece movably received in the connector unit, the second valve piece including a second valve body which includes a hollow second tubular body at one end thereof and a second head on the other end of the hollow second valve body, the second tubular body having a second flange at a distal end thereof and a plurality of second slots defined through a wall of the second tubular body, a second groove defined in an outer periphery of the second head and a second seal engaged with the second groove, the connector unit having inward ribs located therein and a second spring biased between the second head and the inward ribs, the second spring and the second head both located on one of two sides of the second seat, and a locking member including a C-shaped collar and two locking pieces connected to the C-shaped collar, the C-shaped collar rotatably mounted on the connector unit and the two locking pieces extending through the connection rings and hooked on the bodies of the connection rings.

2. The assembly as claimed in claim 1, wherein the connector unit includes an end collar, the second valve piece, the locking member and a connection portion, the end collar is connected to a first end of the connection portion and the second valve piece is located in the connection portion, the second tubular body extends through a passage is defined through the end collar and extends out from the end collar, the second seat is located in an inner periphery of the end collar and an engaging flange is formed on the inner periphery of the end collar, a third groove is defined in an outer periphery of the end collar and a third seal is engaged with the third groove, the connection portion has a stepped inner periphery and a third chamber is defined in the connection portion and a plurality of projections extend from the stepped inner periphery of the connection portion, the projections have inward ribs and an outlet is defined between the projections and the inward ribs, the second spring located in a space between the projections, the second valve body is located in the third chamber, the connection portion has a plurality of cone-shaped protrusions on an outer periphery of a second end thereof, a stop extends radially outward from a mediate portion of the connection portion, a plurality of limitation members extending from an outer periphery of the first end of the connection portion and an engaging groove is defined in the outer periphery of the first end of the connection portion, the C-shaped collar of the locking member is mounted on the connection portion and located between the stop and the limitation members, the engaging flange is engaged with the engaging groove.

3. The assembly as claimed in claim 1, wherein the C-shaped collar has a slit defined therethrough so that the C-shaped collar is expandable.

4. The assembly as claimed in claim 1, wherein the hollow casing of the base includes a connection flange extending therefrom.

* * * * *